US012729461B2

(12) United States Patent
Galamba et al.

(10) Patent No.: US 12,729,461 B2
(45) Date of Patent: Sep. 8, 2026

(54) FLAME RESISTANT, SELF-WRAPPING TEXTILE SLEEVE AND METHOD OF CONSTRUCTION THEREOF

(71) Applicant: Systems Protection Group US LLC, Northville, MI (US)

(72) Inventors: Steven M. Galamba, West Chester, PA (US); Cassie Marie Malloy, Trappe, PA (US)

(73) Assignee: Systems Protection Group US LLC, Northville, MI (US)

(*) Notice: Subject to any disclaimer, the term of this patent is extended or adjusted under 35 U.S.C. 154(b) by 0 days.

(21) Appl. No.: 19/000,582

(22) Filed: Dec. 23, 2024

(65) Prior Publication Data

US 2026/0176801 A1 Jun. 25, 2026

(51) Int. Cl.
*B32B 3/06* (2006.01)
*B32B 3/08* (2006.01)
(Continued)

(52) U.S. Cl.
CPC ............ *D03D 15/513* (2021.01); *B32B 3/06* (2013.01); *B32B 3/08* (2013.01); *B32B 5/024* (2013.01); *B32B 9/005* (2013.01); *B32B 9/047* (2013.01); *D02G 3/16* (2013.01); *D02G 3/443* (2013.01); *D03D 15/247* (2021.01); *B32B 2250/44* (2013.01); *B32B 2262/101* (2013.01); *B32B 2262/105* (2013.01); *B32B 2262/108* (2013.01);
(Continued)

(58) Field of Classification Search
CPC .... B32B 3/02; B32B 3/06; B32B 3/08; B32B 3/10; B32B 3/14; B32B 3/16; B32B 3/18; D03D 15/513
See application file for complete search history.

(56) References Cited

U.S. PATENT DOCUMENTS

2010/0054690 A1 3/2010 Cline
2013/0000471 A1* 1/2013 Malloy .................. F16L 57/00
28/169
(Continued)

FOREIGN PATENT DOCUMENTS

DE 29510907 U1 10/1995
DE 19614853 A1 10/1997
(Continued)

*Primary Examiner* — Elizabeth E Mulvaney
(74) *Attorney, Agent, or Firm* — John D. Wright; Dickinson Wright PLLC

(57) ABSTRACT

A flame resistant, wrappable textile sleeve for providing thermal protection to an elongate member contained therein includes an inner wall of interlaced yarn including heat-resistant yarn. The inner wall has opposite inner edges extending lengthwise in generally parallel relation with a longitudinal axis between opposite inner ends with an outer surface and an inner surface bounded by the inner edges and the inner ends. An outer wall has an inner surface and an outer surface bounded by opposite outer edges extending lengthwise in generally parallel relation with the longitudinal axis between opposite outer ends. The inner surface of the outer wall is fixed to the outer surface of the inner wall. One of the outer edges of the outer wall extends beyond one of the inner edges of the inner wall to provide a flap having adhesive layer for selective adhesion to the outer surface of the outer wall.

20 Claims, 4 Drawing Sheets

(51) Int. Cl.

| | |
|---|---|
| ***B32B 5/02*** | (2006.01) |
| ***B32B 9/00*** | (2006.01) |
| ***B32B 9/04*** | (2006.01) |
| ***D02G 3/16*** | (2006.01) |
| ***D02G 3/44*** | (2006.01) |
| ***D03D 15/242*** | (2021.01) |
| ***D03D 15/513*** | (2021.01) |

(52) U.S. Cl.
CPC ... *B32B 2307/3065* (2013.01); *B32B 2571/00* (2013.01); *D10B 2401/04* (2013.01); *D10B 2505/00* (2013.01)

(56) References Cited

U.S. PATENT DOCUMENTS

| | | | | |
|---|---|---|---|---|
| 2013/0062097 | A1* | 3/2013 | Hammond | H01B 3/46 174/120 SR |
| 2014/0356564 | A1* | 12/2014 | Yamaguchi | H02G 3/0481 428/36.1 |
| 2017/0036412 | A1* | 2/2017 | Malloy | B32B 1/08 |
| 2022/0049129 | A1 | 2/2022 | Schmidlin | |
| 2022/0275249 | A1 | 9/2022 | Schmidlin | |
| 2023/0287607 | A1 | 9/2023 | Lesur | |
| 2023/0323573 | A1 | 10/2023 | Sueur | |
| 2024/0266632 | A1* | 8/2024 | Boatwright | H01M 10/625 |

FOREIGN PATENT DOCUMENTS

| | | | |
|---|---|---|---|
| DE | 19620963 | A1 | 11/1997 |
| DE | 102011086191 | A1 | 3/2013 |
| DE | 102022127834 | A1 | 5/2024 |
| EP | 0886358 | A2 | 12/1998 |
| EP | 2034576 | A1 | 3/2009 |
| EP | 2497805 | A1 | 9/2012 |
| WO | 2023052251 | A1 | 4/2023 |

* cited by examiner 30
32a
36
32b
18a
18b
28
44
38
38
26
14
12
22
10
24

28
30
32a
10
18a
38
18b
36
12
32b
24
22
26
14

FLAME RESISTANT, SELF-WRAPPING TEXTILE SLEEVE AND METHOD OF CONSTRUCTION THEREOF

BACKGROUND OF THE INVENTION

1. Technical Field

This invention relates generally to tubular protective sleeves for providing thermal protection to an elongate member contained therein, and more particularly to wrappable, textile tubular protective sleeves for providing thermal protection to an elongate electrical member or conduit contained therein and to their method of construction.

2. Related Art

It is known to contain and protect elongate members, such as cables, wires, wire harnesses, and fluid conveying conduits, for example, in wrappable textile sleeves to provide protection against abrasion to the cables, wires, and hoses contained therein. Improvements of known wrappable textile sleeves are desired to provide enhanced protection, including protection against extreme heat, including flame, while also being flexible for routing cables, wires and wire harnesses through winding areas, while also having a low, non-bulky radially extending profile for applications having tight passages and weight restrictions, such as in automotive, aircraft and aerospace applications, for example, while also being economical in manufacture.

SUMMARY OF THE INVENTION

In accordance with one aspect of the invention, a flame resistant, wrappable textile sleeve for providing thermal protection to an elongate member contained therein is provided. The flame resistant, wrappable textile sleeve includes an inner wall of interlaced yarn including heat-resistant yarn. The inner wall has opposite inner edges extending lengthwise in generally parallel relation with a longitudinal axis between opposite inner ends with an outer surface and an inner surface bounded by the inner edges and the inner ends. An outer wall of mica-based material is fixed to the inner wall. The outer wall has an inner surface and an outer surface bounded by opposite outer edges extending lengthwise in generally parallel relation with the longitudinal axis between opposite outer ends. The inner surface of the outer wall is fixed to the outer surface of the inner wall. One of the outer edges of the outer wall extends beyond one of the inner edges of the inner wall to provide a flap of the outer wall. An adhesive layer is bonded to the flap for selective adhesion to the outer surface of the outer wall to maintain the sleeve in a closed, tubular configuration about the elongate member contained therein.

In accordance with another aspect of the disclosure, one of the outer edges of the outer wall is aligned in flush relation with one of the inner edges of the inner wall.

In accordance with another aspect of the disclosure, the inner surface of the outer wall is bonded to the outer surface of the inner wall by the adhesive layer.

In accordance with another aspect of the disclosure, a release layer is releasably bonded to the adhesive layer for selective removal from the adhesive layer to expose the adhesive layer for adhesion to the outer surface of the outer wall.

In accordance with another aspect of the disclosure, the heat-resistant yarn includes mineral yarn.

In accordance with another aspect of the disclosure, the mineral yarn includes at least one of fiberglass, silica, ceramic, and basalt.

In accordance with another aspect of the disclosure, the interlaced yarn includes heat-formed yarn, with the heat-formed yarn imparting a bias on the inner wall to bring the inner edges into overlapping relation with one another.

In accordance with another aspect of the disclosure, the interlaced yarn is woven with warp yarn extending generally parallel to the longitudinal axis and weft yarn extending generally transverse to the longitudinal axis, with the weft yarn including the heat-formed yarn.

In accordance with another aspect of the disclosure, the weft yarn is provided entirely of the heat-formed yarn.

In accordance with another aspect of the disclosure, the weft yarn includes the mineral yarn.

In accordance with another aspect of the disclosure, the heat-formed yarn and the mineral yarn alternate with one another.

In accordance with another aspect of the disclosure, the warp yarn is provided entirely of the mineral yarn.

In accordance with another aspect of the disclosure, a method of constructing a flame resistant, wrappable textile sleeve for providing thermal protection to an elongate member contained therein is provided. The method includes interlacing yarn, including heat-resistant yarn, to form an inner wall having an inner surface and an outer surface bounded by opposite inner edges extending lengthwise between opposite inner ends. The method further includes providing an outer wall of mica-based material having an inner surface and an outer surface bounded by opposite outer edges extending lengthwise between opposite outer ends, and further, fixing the inner surface of the outer wall to the outer surface of the inner wall with one of the outer edges of the outer wall extending beyond one of the inner edges of the inner wall to provide a flap of the outer wall. The method further includes providing the flap with an adhesive layer for selective adhesion to the outer surface of the outer wall to maintain the sleeve in a closed, protective tubular configuration about the elongate member contained therein.

In accordance with another aspect of the disclosure, the method further includes fixing the inner surface of the outer wall to the outer surface of the inner wall with the same adhesive layer on the flap.

In accordance with another aspect of the disclosure, the method further includes releasably fixing a release layer releasably to the adhesive layer on the flap for selective removal from the adhesive layer to allow the flap to be adhered to the outer surface of the outer wall.

In accordance with another aspect of the disclosure, the method further includes providing the heat-resistant yarn with at least one of fiberglass yarn, silica yarn, ceramic yarn, and basalt yarn.

In accordance with another aspect of the disclosure, the method further includes heat-forming some of the interlaced yarn to impart a bias on the inner wall to bring the inner edges into overlapping relation with one another.

In accordance with another aspect of the disclosure, the method further includes interlacing the yarn in a weaving process to interlace warp yarn, extending generally parallel to the longitudinal axis, with weft yarn, extending generally transverse to the longitudinal axis, and providing the weft yarn including the heat-formed yarn.

In accordance with another aspect of the disclosure, the method further includes providing the weft yarn entirely of the heat-formed yarn.

In accordance with another aspect of the disclosure, the method further includes providing the warp yarn entirely of the mineral yarn.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
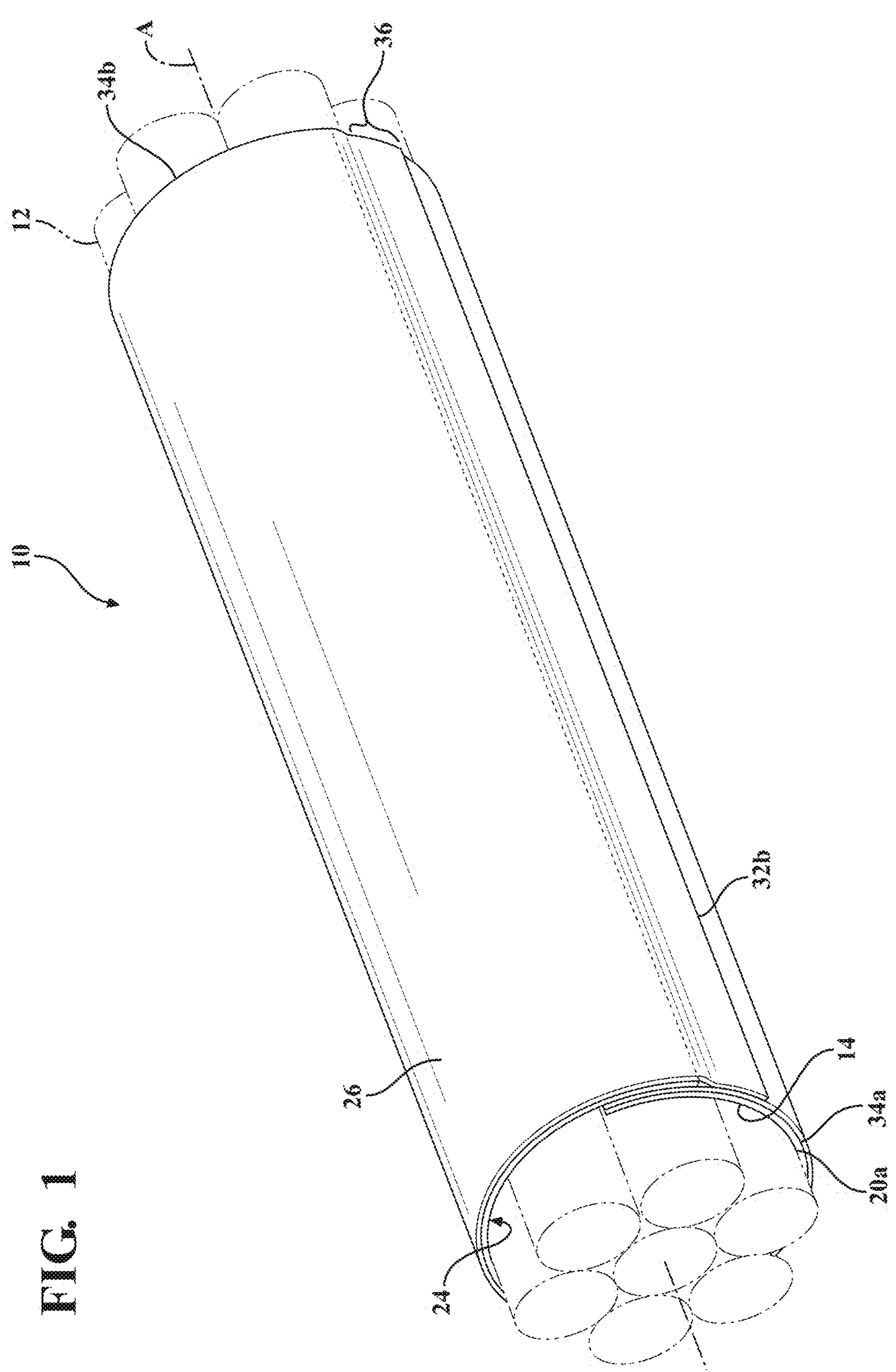
FIG. 1 is a schematic isometric view of flame-resistant, sleeve constructed in accordance with one aspect of the invention shown wrapped about an elongate member to be protected within a central cavity bounded a multilayer wall of the sleeve.
Figure 2A:
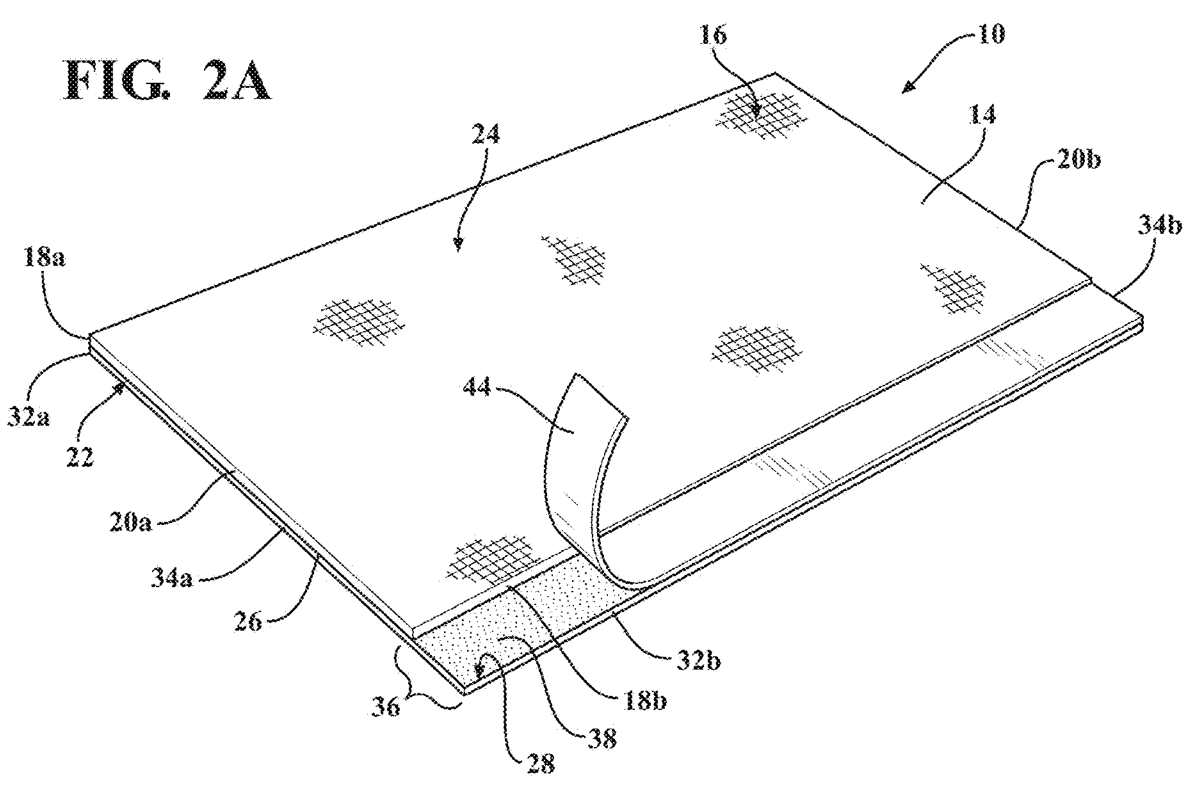
FIG. 2A is an inside isometric view of the sleeve of FIG. 1 shown prior to being wrapped, and further shown with a release layer partially removed from an underlying adhesive layer.
Figure 2B:
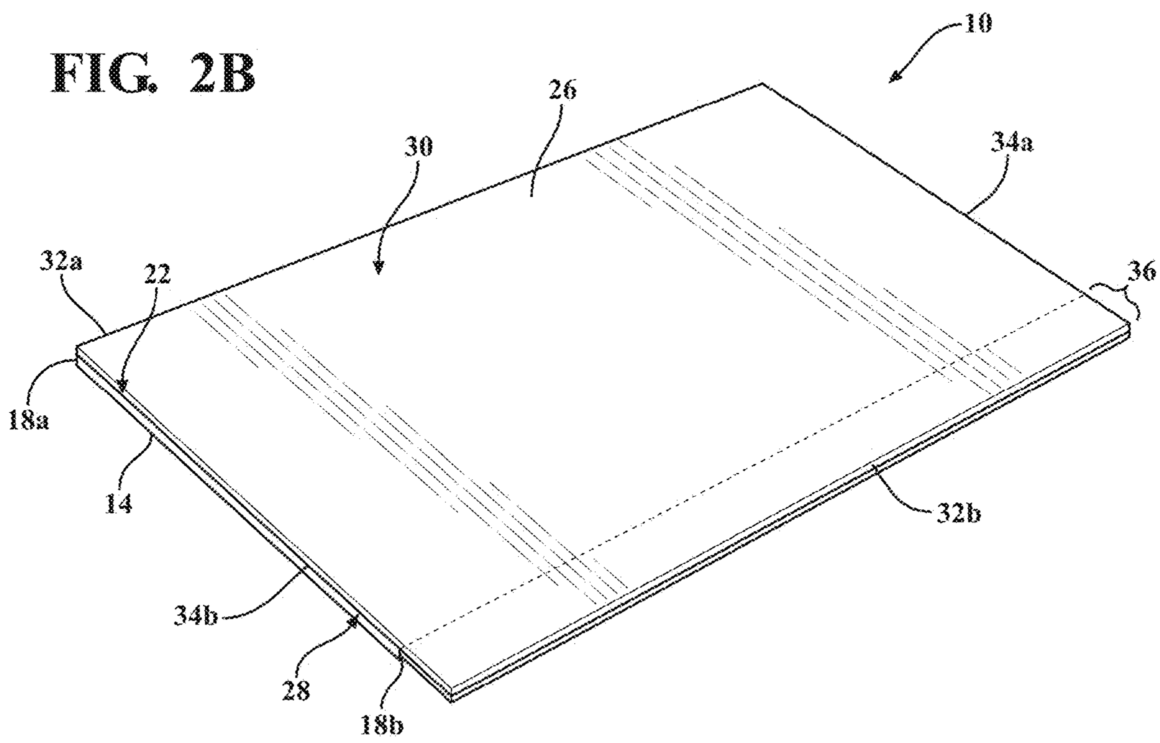
FIG. 2B is an outside isometric view of the sleeve of FIG. 1 shown prior to being wrapped, and further shown with the release layer releasably bonded to the underlying adhesive layer.
Figure 3A:
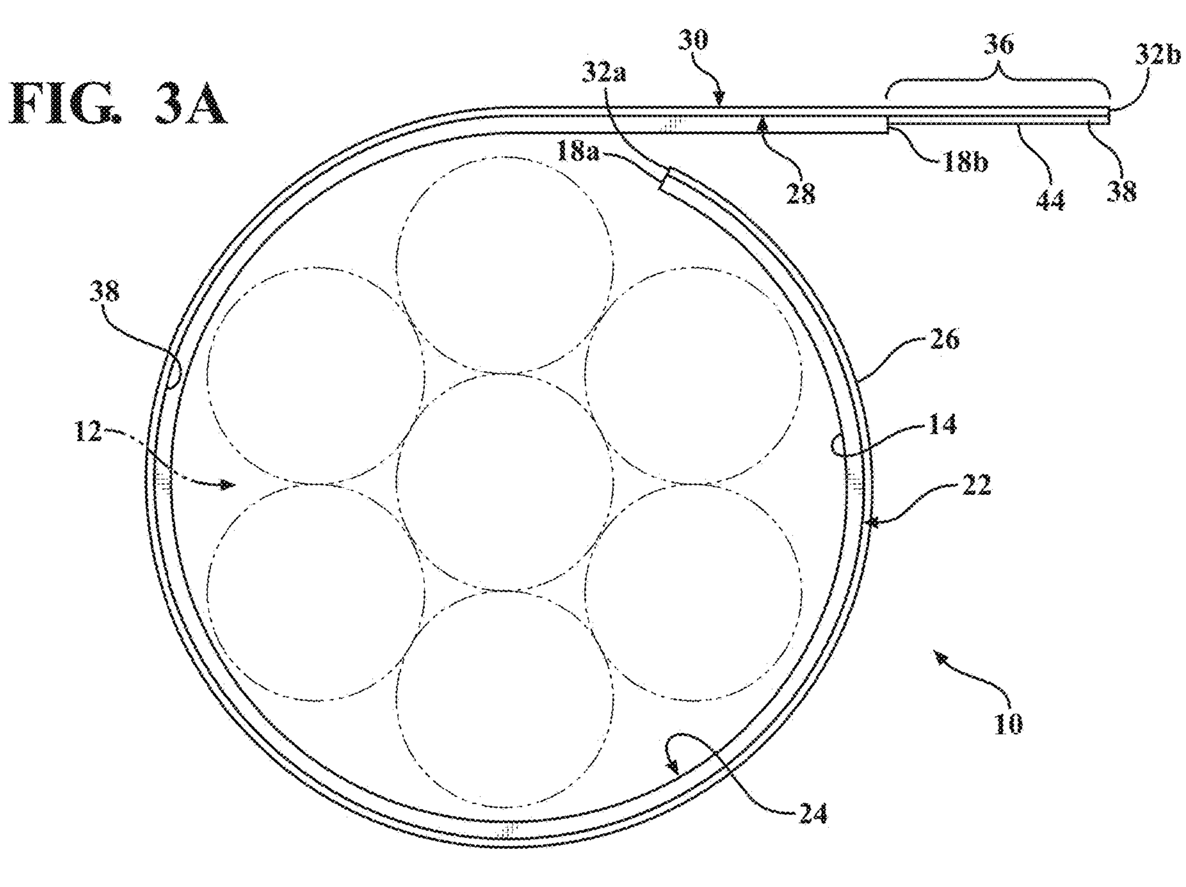
FIG. 3A is a schematic end view of the sleeve of FIG. 1 shown being wrapped about the elongate member with the release layer releasably bonded to the underlying adhesive layer.
Figure 3B:
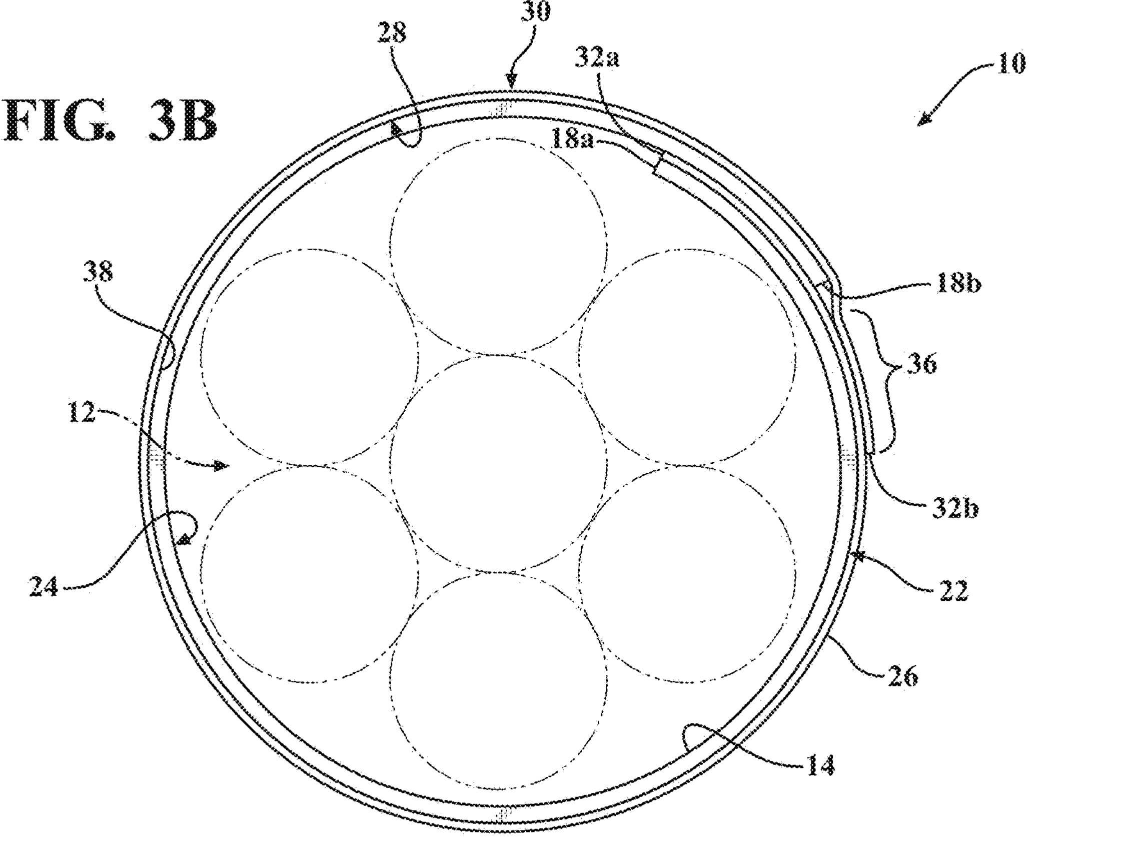
FIG. 3B is a cross-sectional view taken generally along the line 3B-3B of FIG. 1.

Referring in more detail to the drawings, FIG. 1 illustrates a flame resistant, wrappable textile sleeve, referred to hereafter as sleeve 10, for providing thermal protection to and about an elongate member 12, such as a cable, wire, wire harness, or fluid conduit. The sleeve 10 includes an inner wall 14 of interlaced yarns 16. The inner wall 14 has opposite inner edges 18*a*, 18*b* extending lengthwise in generally parallel relation to a longitudinal central axis A between opposite inner ends 20*a*, 20*b*, with an outer surface 22 and an inner surface 24 bounded by the inner edges 18*a*, 18*b* and the inner ends 20*a*, 20*b*. The sleeve 10 further includes an outer wall 26 of a mica-based material fixed to the inner wall 14. The outer wall 26 has an inner surface 28 and an outer surface 30 bounded by opposite outer edges 32*a*, 32*b* extending lengthwise in generally parallel relation with the longitudinal axis between opposite outer ends. The inner surface 28 of the outer wall 26 is fixed to the outer surface 22 of the inner wall 14. One of the outer edges 32*b* of the outer wall 26 extends beyond one of the inner edges 18*b* of the inner wall 14 to provide a flap 36 of the outer wall 26. An adhesive layer 38 is bonded to the flap 36 for selective adhesion to the outer surface of the outer wall 26 to maintain the sleeve 10 in a closed, tubular configuration about the elongate member 12 contained therein. Accordingly, the elongate member 12 is thoroughly shielded against thermal conditions over a wide range of temperatures, including extreme heat from flame, as discussed further hereafter.

Figure 4A:
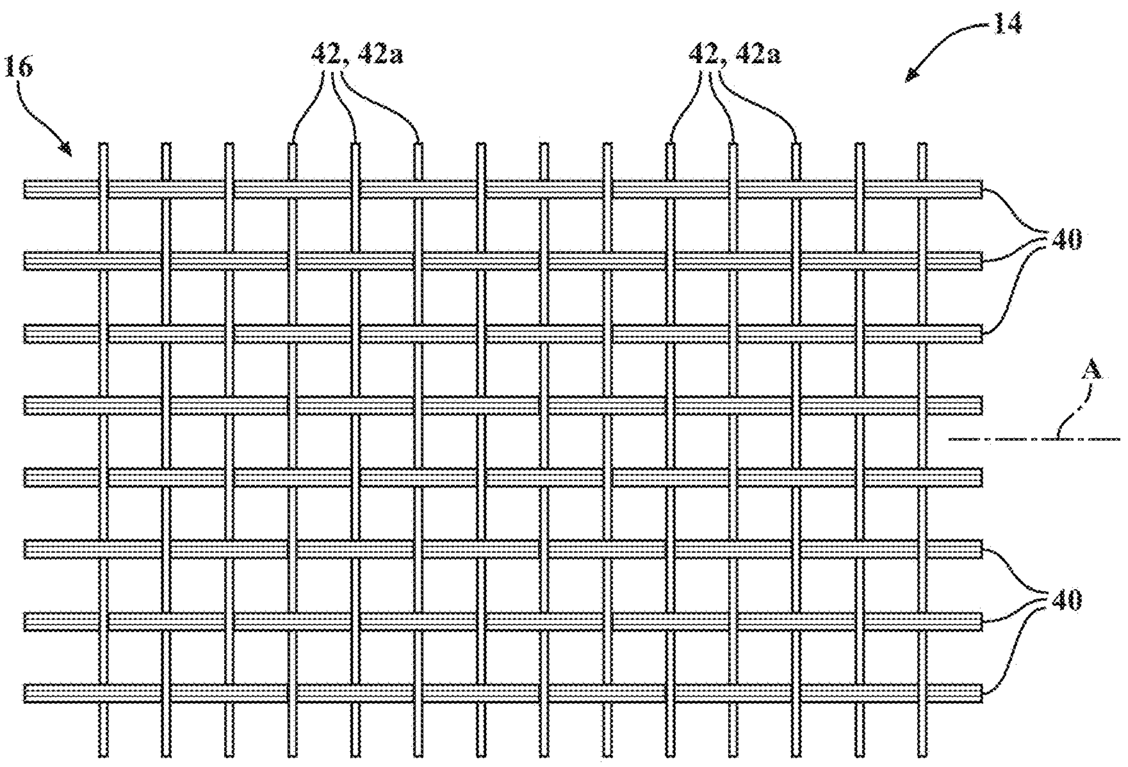
FIG. 4A is a fragmentary plan view of an inner wall of the sleeve of FIG. 1 constructed in accordance with one aspect of the disclosure.
Figure 4B:
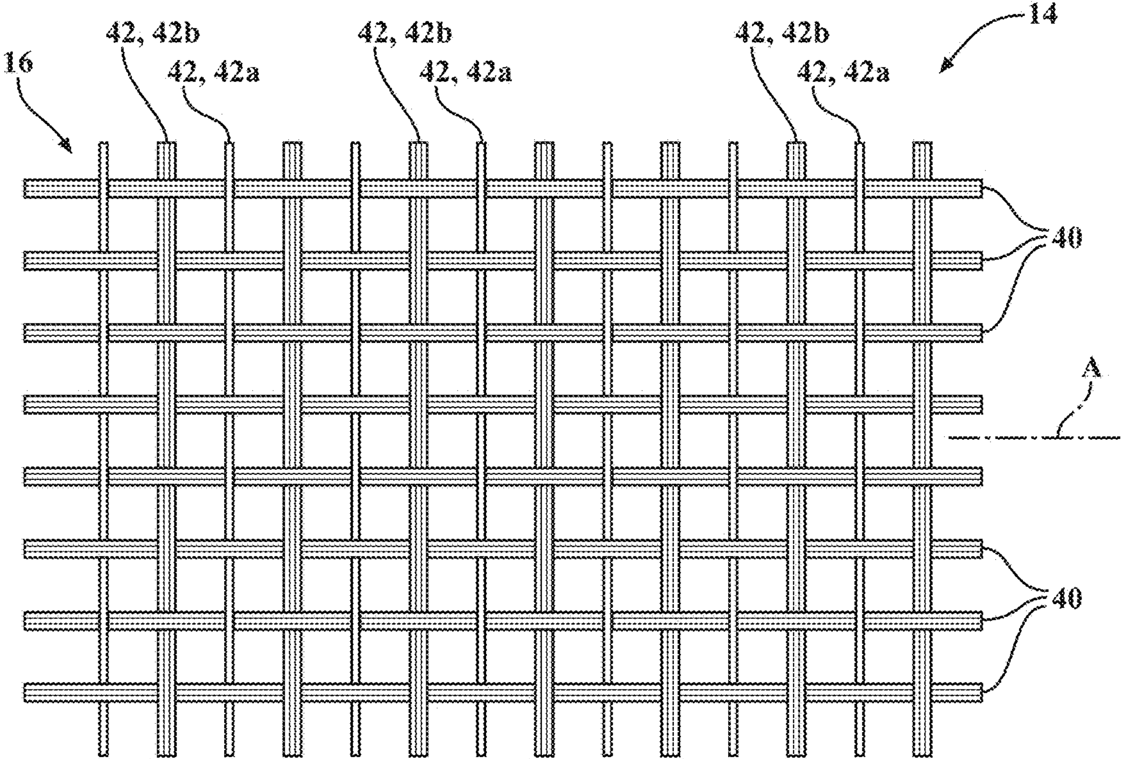
FIG. 4B is a view similar to FIG. 4A of an inner wall of the sleeve of FIG. 1 constructed in accordance with another aspect of the disclosure.

The interlaced yarns 16 of the inner wall 14, as best shown in alternate embodiments of FIGS. 4A and 4B, are woven with warp yarn(s) 40 extending generally parallel to the longitudinal central axis A and weft yarn(s) 42 extending generally transverse to the longitudinal central axis A. The warp yarn(s) 40 are provided including heat-resistant yarn 40*a*, and in an exemplary embodiment, the heat-resistant yarn includes multifilaments of mineral yarn 40*a*. The mineral yarn 40*a* includes at least one of fiberglass yarn, silica yarn, ceramic yarn, and basalt yarn. The weft yarn(s) 42 are provided including heat-set, also referred to as heat-formed yarn(s) 42*a*, wherein the heat-formed yarn(s) 42 impart a bias on the inner wall 14 to bias the inner edges 18*a*, 18*b* into overlapping relation with one another, such that the sleeve 10 is self-wrapping, and such that the elongate member 12 is fully protected against thermal conditions about the entire circumference of the sleeve 10. The heat-formed yarn 42*a* of the inner wall 14 can be provided as any suitable heat-formable monofilament material or multifilament material, such as polypropylene, polyethylene, or otherwise. In one embodiment, the weft yarn 42 is provided entirely of the heat-formed yarn 42*a*, as shown in FIG. 4A, thereby maximizing the self-closing bias imparted on the inner wall 14. Otherwise, to further enhance the thermal protection provided by the sleeve 10, the weft yarn(s) 42 can also include heat-resistant yarns 42*b*, with the heat-resistant yarns 42*b* being provided of the same yarns discussed above for the heat-resistant yarns 40*a*. The heat-formed yarn(s) 42*a* and the heat-resistant yarn(s) 42*b* can be woven in alternating relation with one another along the length of the sleeve 10, as shown in FIG. 4B.

The outer wall 26 is provided as a sheet, also referred to as film, of flame-resistant material, thereby rendering the sleeve 10 highly protective against extreme heat conditions, including flame. In accordance with one aspect, the heat-resistant material is provided as a composite film of mica-based material, with the active ingredient being mica. The inner surface 28 of the outer wall 26 is bonded to the outer surface 22 of the inner wall 14 by the adhesive layer 38 extending along the flap 36. Accordingly, the entirety of the inner surface 28 of the outer wall 26 is coated with the adhesive layer 38. One inner edge 18*a* can be aligned in flush relation with one outer edge 32*a*, with the other outer edge 32*b* extending beyond the other inner edge 18*b* to form the flap 36. A release layer 44 is releasably bonded to the adhesive layer 38 of the flap 36 for selective removal from the adhesive layer 38 to expose the adhesive layer 38 of the flap 36 for adhesion to the outer surface 30 of the outer wall 26 while applying the sleeve 10 about the elongate member 12.

In accordance with another aspect of the invention, a method of constructing a flame resistant, wrappable textile sleeve 10 for providing thermal protection to an elongate member 12 contained therein includes: interlacing yarn 16 including heat-resistant yarn 40*a* to form an inner wall 14 having an inner surface 24 and an outer surface 22 bounded by opposite inner edges 18*a*, 18*b* extending lengthwise between opposite inner ends 20*a*, 20*b*. Further, providing an outer wall 26 of mica-based material having an inner surface 28 and an outer surface 30 bounded by opposite outer edges 32*a*, 32*b* extending lengthwise between opposite outer ends 34*a*, 34*b*. Further, fixing the inner surface 28 of the outer wall 26 to the outer surface 22 of the inner wall 14 with one of the outer edges 32*b* of the outer wall 26 extending beyond one of the inner edges 18*b* of the inner wall 14 to provide a flap 36 of the outer wall 26. Further yet, providing the flap 36 with an adhesive layer 38 for selective adhesion to the outer surface 30 of the outer wall 26.

In accordance with a further aspect, the method can further include fixing the inner surface 28 of the outer wall 26 to the outer surface 22 of the inner wall 14 with the same adhesive layer 38 on the flap 36.

In accordance with a further aspect, the method can further include releasably fixing a release layer 44 to the adhesive layer 38 on the flap 36 for selective removal from the adhesive layer 38 to allow the flap 36 to be adhered to the outer surface 30 of the outer wall 26.

In accordance with a further aspect, the method can further include providing the heat-resistant yarn 40*a* with at least one of fiberglass, silica, ceramic, and basalt.

In accordance with a further aspect, the method can further include heat-forming some of the interlaced yarn 16 to impart a bias on the inner wall 14 to bring the inner edges 18*a*, 18*b* into overlapping relation with one another.

In accordance with a further aspect, the method can further include interlacing the yarn 16 in a weaving process to interlace warp yarn 40, extending generally parallel to the longitudinal axis A, with weft yarn 42, extending generally transverse to the longitudinal axis A, and providing the weft yarn 42 including the heat-formed yarn 42*a*.

In accordance with a further aspect, the method can further include providing the weft yarn 42 entirely of the heat-formed yarn 42*a*.

In accordance with a further aspect, the method can further include providing the warp yarn 40 entirely of the mineral yarn.

Many modifications and variations of the present invention are possible in light of the above teachings, as will be readily appreciated by one possessing ordinary skill in the art. It is contemplated that all features of all claims and of all embodiments can be combined with each other, so long as such combinations would not contradict one another. It is, therefore, to be understood that the invention may be practiced otherwise than as specifically described, and that the scope of the invention is defined by any ultimately allowed claims.

What is claimed is:

1. A flame resistant, wrappable textile sleeve for providing thermal protection to an elongate member contained therein, comprising:
- an inner wall of interlaced yarn including heat-resistant yarn, said inner wall having opposite inner edges extending lengthwise in generally parallel relation with a longitudinal axis between opposite inner ends, and having an outer surface and an inner surface bounded by said inner edges and said inner ends, wherein said heat-resistant yarn includes mineral yarn;
- an outer wall of mica-based material having an inner surface and an outer surface bounded by opposite outer edges extending lengthwise in generally parallel relation with said longitudinal axis between opposite outer ends, said inner surface of said outer wall fixed to said outer surface of said inner wall with one of said outer edges of said outer wall extending beyond one of said inner edges of said inner wall to provide a flap of said outer wall;
- an adhesive layer bonded to said flap for selective adhesion to said outer surface of said outer wall; and
- wherein said interlaced yarn includes heat-formed yarn, said heat-formed yarn imparting a bias on said inner wall to bring said inner edges into overlapping relation with one another.

2. The flame resistant, wrappable textile sleeve of claim 1, wherein one of said outer edges of said outer wall is aligned in flush relation with one of said inner edges of said inner wall.

3. The flame resistant, wrappable textile sleeve of claim 1, wherein said inner surface of the outer wall is bonded to the outer surface of the inner wall by said adhesive layer.

4. The flame resistant, wrappable textile sleeve of claim 1, further including a release layer releasably bonded to said adhesive layer for selective removal from said adhesive layer to expose said adhesive layer for adhesion to said outer surface of said outer wall.

5. The flame resistant, wrappable textile sleeve of claim 1, wherein said mineral yarn includes at least one of fiberglass, silica, ceramic, and basalt.

6. The flame resistant, wrappable textile sleeve of claim 1, wherein said interlaced yarn is woven with warp yarn extending generally parallel to said longitudinal axis and weft yarn extending generally transverse to said longitudinal axis, said weft yarn including said heat-formed yarn.

7. The flame resistant, wrappable textile sleeve of claim 6, wherein said weft yarn is provided entirely of said heat-formed yarn.

8. The flame resistant, wrappable textile sleeve of claim 6, wherein said weft yarn includes said mineral yarn.

9. The flame resistant, wrappable textile sleeve of claim 8, wherein said heat-formed yarn and said mineral yarn alternate with one another.

10. The flame resistant, wrappable textile sleeve of claim 1, wherein said warp yarn is provided entirely of said mineral yarn.

11. A method of constructing a flame resistant, wrappable textile sleeve for providing thermal protection to an elongate member contained therein, comprising:
- interlacing yarn including heat-resistant yarn to form an inner wall having an inner surface and an outer surface bounded by opposite inner edges extending lengthwise between opposite inner ends;
- providing an outer wall of mica-based material having an inner surface and an outer surface bounded by opposite outer edges extending lengthwise between opposite outer ends;
- fixing the inner surface of the outer wall to the outer surface of the inner wall with one of the outer edges of the outer wall extending beyond one of the inner edges of the inner wall to provide a flap of the outer wall; and
- providing the flap with an adhesive layer for selective adhesion to the outer surface of the outer wall; and
- heat-forming some of the interlaced yarn to impart a bias on the inner wall to bring the inner edges into overlapping relation with one another.

12. The method of claim 11, further including fixing the inner surface of the outer wall to the outer surface of the inner wall with the same adhesive layer on the flap.

13. The method of claim 12, further including releasably fixing a release layer releasably to the adhesive layer on the flap for selective removal from the adhesive layer to allow the flap to be adhered to the outer surface of the outer wall.

14. The method of claim 11, further including providing the heat-resistant yarn with at least one of fiberglass, silica, ceramic, and basalt.

15. The method of claim 11, further including interlacing the yarn in a weaving process to interlace warp yarn, extending generally parallel to the longitudinal axis, with weft yarn, extending generally transverse to the longitudinal axis, and providing the weft yarn including the heat-formed yarn.

16. The method of claim 15, further including providing the weft yarn entirely of the heat-formed yarn.

17. The method of claim 15, further including providing the warp yarn entirely of the mineral yarn.

18. A flame resistant, wrappable textile sleeve for providing thermal protection to an elongate member contained therein, comprising:

an inner wall of interlaced yarn including heat-resistant yarn, said inner wall having opposite inner edges extending lengthwise in generally parallel relation with a longitudinal axis between opposite inner ends, and having an outer surface and an inner surface bounded by said inner edges and said inner ends;

an outer wall of mica-based material having an inner surface and an outer surface bounded by opposite outer edges extending lengthwise in generally parallel relation with said longitudinal axis between opposite outer ends, said inner surface of said outer wall fixed to said outer surface of said inner wall; and wherein said interlaced yarn includes heat-formed yarn, said heat-formed yarn imparting a bias on said inner wall to bring said inner edges into overlapping relation with one another.

19. The flame resistant, wrappable textile sleeve of claim 18, wherein said heat-resistant yarn includes mineral yarn.

20. The flame resistant, wrappable textile sleeve of claim 19, wherein said mineral yarn includes at least one of fiberglass, silica, ceramic, and basalt.

* * * * *